United States Patent
Roques-Bonnet

(10) Patent No.: US 12,413,397 B2
(45) Date of Patent: Sep. 9, 2025

(54) PERSONAL DATA CHOICE MANAGEMENT PLATFORM

(71) Applicant: ID SIDE, Lamorlaye (FR)

(72) Inventor: Marie-charlotte Emilie Roques-Bonnet, Lamorlaye (FR)

(73) Assignee: ID SIDE, Lamorlaye (FR)

( * ) Notice: Subject to any disclaimer, the term of this patent is extended or adjusted under 35 U.S.C. 154(b) by 352 days.

(21) Appl. No.: 17/793,752

(22) PCT Filed: Nov. 23, 2020

(86) PCT No.: PCT/IB2020/061034
§ 371 (c)(1),
(2) Date: Jul. 19, 2022

(87) PCT Pub. No.: WO2021/156664
PCT Pub. Date: Aug. 12, 2021

(65) Prior Publication Data
US 2023/0061255 A1    Mar. 2, 2023

(30) Foreign Application Priority Data
Feb. 7, 2020    (FR) .................. FR2001210

(51) Int. Cl.
*G06Q 30/0251*    (2023.01)
*H04L 9/08*    (2006.01)
*H04L 9/40*    (2022.01)

(52) U.S. Cl.
CPC ....... *H04L 9/0847* (2013.01); *G06Q 30/0251* (2013.01); *H04L 63/0407* (2013.01)

(58) Field of Classification Search
CPC . H04L 9/0852; H04L 9/00; H04L 9/12; H04L 9/321; H04L 9/0847; H04L 63/0407; G06Q 30/0251
See application file for complete search history.

(56) References Cited

U.S. PATENT DOCUMENTS

| | | | |
|---|---|---|---|
| 2007/0022294 A1* | 1/2007 | Lapstun | G06F 16/9554 713/176 |
| 2008/0201216 A1* | 8/2008 | Almeida | G06Q 30/0254 705/14.52 |

(Continued)

OTHER PUBLICATIONS

International Search Report, issued in PCT/IB2020/061034, dated Feb. 26, 2021.

*Primary Examiner* — Jung W Kim
*Assistant Examiner* — Howard H. Louie
(74) *Attorney, Agent, or Firm* — Birch, Stewart, Kolasch & Birch, LLP

(57) ABSTRACT

A network communication method for accessing a service on a remote system by a client system includes receiving data from a user personal data management system, the data including at least one definition of at least one choice of a user for processing personal data associated with the user, the at least one definition being associated with an identifier of the user, transmission of a connection request to the remote server including at least the definition associated with the identifier, establishing a first communication between the client system and the remote system, and establishing a second communication from the remote system to the client system, the second communication being authorized by the management system, based on the definition.

9 Claims, 7 Drawing Sheets

(56) References Cited

U.S. PATENT DOCUMENTS

2009/0271261 A1    10/2009  Mehta et al.
2011/0071893 A1*   3/2011  Malhotra ............. G06Q 10/109
                                                                  709/225
2012/0023547 A1*   1/2012  Maxson ............. H04L 63/0407
                                                                   726/1

* cited by examiner

PERSONAL DATA CHOICE MANAGEMENT PLATFORM

TECHNICAL FIELD OF THE INVENTION

The present invention relates to the field of online communications. More particularly, it relates to the protection of personal data of users of communication networks such as the Internet for example.

TECHNICAL BACKGROUND

When a user accesses online services, for example on the Internet, he or she is faced with the difficulty of controlling the use that these services make of his or her personal data.

The control of this data comes up against the tedious task of expressing choices in this matter for each service used (for example on each website visited). The possibility to express such choices is not always available. When it is, the choices may be limited, poorly expressed or complex for a quick and efficient understanding.

To address this issue, several approaches have been proposed. For example, web browsers allow a user to authorize or block cookies, either generally or on a case-by-case basis. The purpose of allowing (or disallowing) cookies is to accurately control the tracking done by the websites visited. However, in practice, this method is very difficult to use. For example, a general blocking of cookies makes it impossible to browse many websites. For example, blocking cookies on a case-by-case basis requires an advanced level of expertise and is very tedious because each cookie must be managed individually and a choice made according to purposes thereof.

For example, there are also browser extensions that aim to limit the online tracking of users by blocking websites and cookies that appear to track the user. These extensions use various heuristic methods that are more or less effective but sometimes interfere with the functioning of the websites visited.

In addition, standards have been defined by the World Wide Web Consortium (W3C). In 2015, the W3C developed a standard allowing browser users to signal to visited sites whether they agree to be tracked or not, giving a way to express a form of consent on tracking on the internet, regardless of the technology used. However, this standard was not very successful and it is now considered abandoned.

Before that, in 2002, the W3C had already proposed another standard, called "P3P" (acronym for "Platform for Privacy Preferences Project"), which allows websites to inform users of their intentions regarding the use of their personal data. However, this approach does not allow users to express a choice about data processing. It only informs them. This standard is also considered obsolete.

It thus appears that although the protection and processing of personal data is a major issue in the field of electronic communications on networks today, the solutions to enable users to control them effectively are not satisfactory.

All of the above-mentioned approaches address only one problem, that of online tracking, but do not address other types of use of the user's personal data.

Thus, there is a need to improve users' control of their personal data when using online services. The present invention lies within this context.

SUMMARY OF THE INVENTION

A first aspect of the invention relates to a method of communication over a network for access by a client system to a service on a remote system comprising the following steps:

receiving data from a user personal data management system, said data comprising at least one definition of at least one choice of a user for processing personal data associated with the user, said at least one definition being associated with an identifier of the user, transmission of a connection request to said remote server including at least said definition associated with said user identifier, establishing a first communication between said client system and said remote system for the provision of said service based on a response of said remote system to said definition, and establishing a second communication from said remote system to said client system, said second communication being authorized by said management system, based on said definition.

According to embodiments, the method further comprises generating, from said user identifier, an encrypted identifier, and in the connection request to said remote server, said definition is associated with said encrypted identifier.

According to embodiments, said management system:
generates said identifier as well as a cryptographic key for the generation of the encrypted identifier,
receives said at least one choice from the user for the processing of their personal data when communicating with the client system, and
records said at least one definition.

In embodiments, said remote system transmits to said management system a proposed second communication associated with said encrypted identifier, and said management system determines the user for whom said second communication is intended from said encrypted identifier.

According to embodiments, said second communication is established directly between the management system and the client system.

According to embodiments, said second communication is established between the remote system and the client system.

According to embodiments, said at least one definition is stored within a personal data management client module accessible to the client system.

According to embodiments, said at least one preference is received from the management system and wherein said storing comprises formatting said at least one preference for transmission to the remote system.

According to embodiments:
said remote system analyzes said connection request to accept or not said at least one definition and transmit said response, and
said personal data management module displays said response to the user.

A second aspect of the invention relates to a communication device comprising a processing unit configured to implement steps according to the method according to the first aspect.

A third aspect of the invention relates to a communication system comprising:
a client system,
a remote system, and
a system for managing the personal data of a user of the client system using said client system to access a service on said remote system,
wherein the client system, the remote system and the management system are configured to implement a method according to the first aspect.

FIGURES

Figure 5:
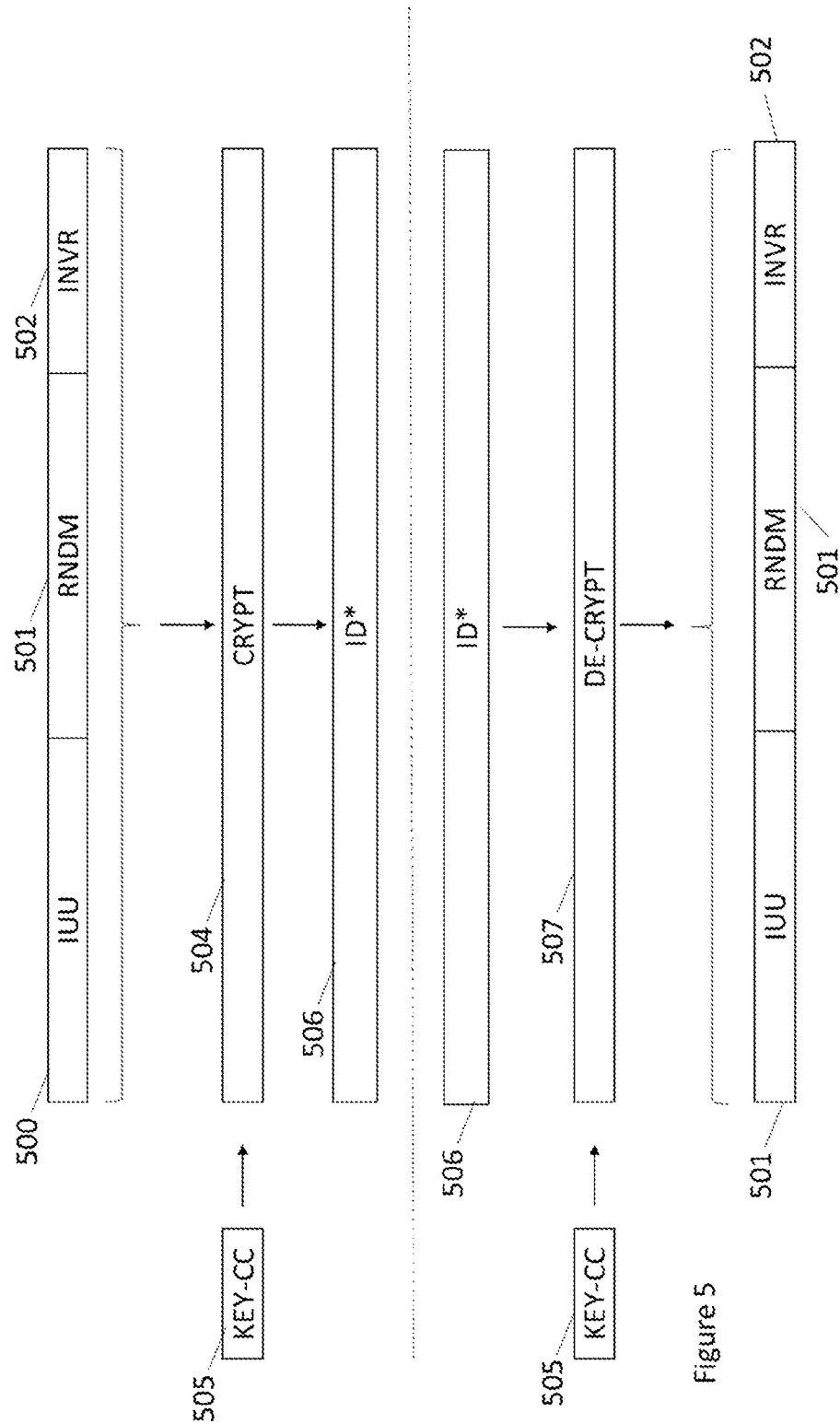

FIG. 5 schematically illustrates an encrypted user ID according to embodiments.

Figure 6:
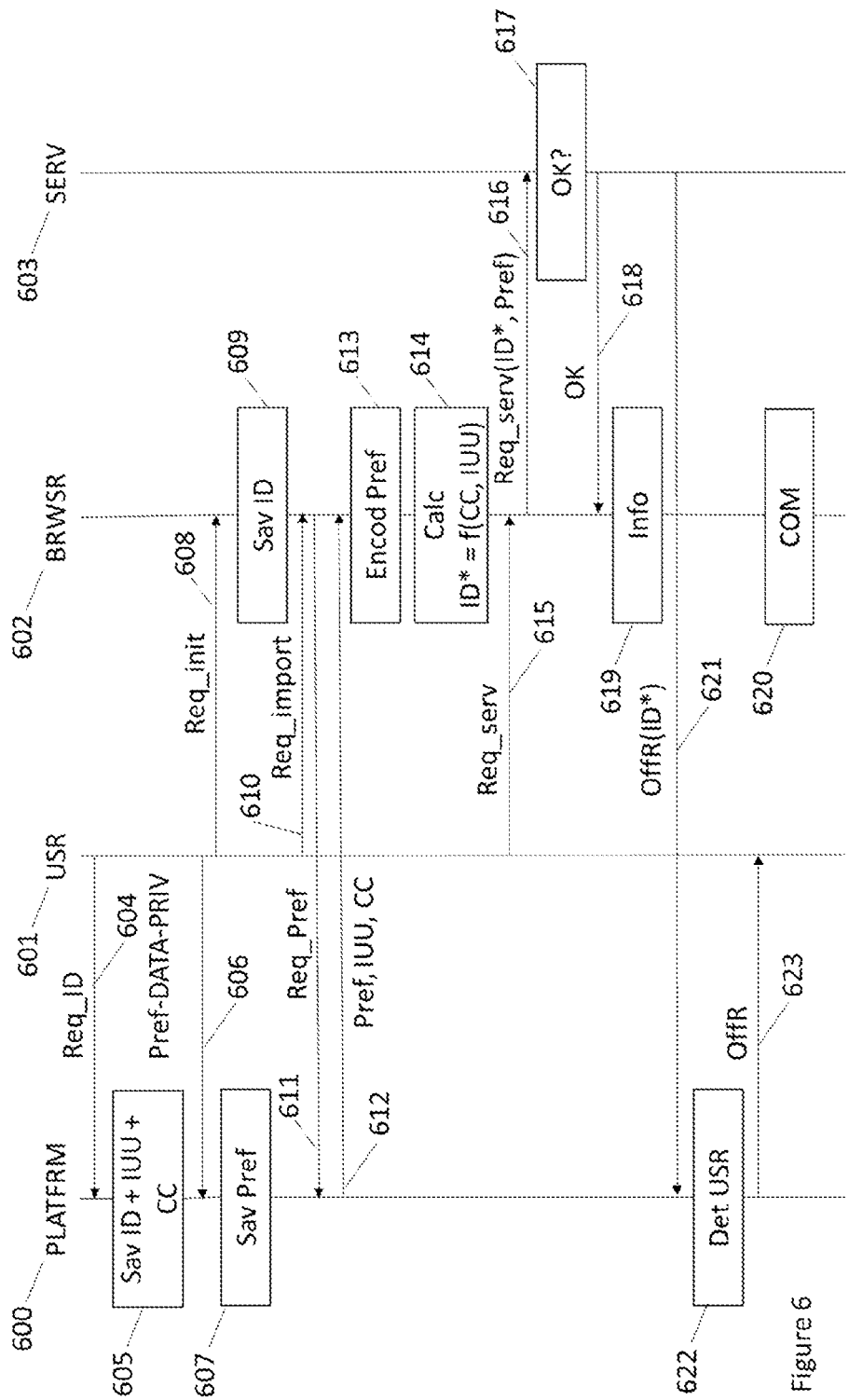

FIG. 6 schematically illustrates communications implemented according to embodiments.

Figure 7:
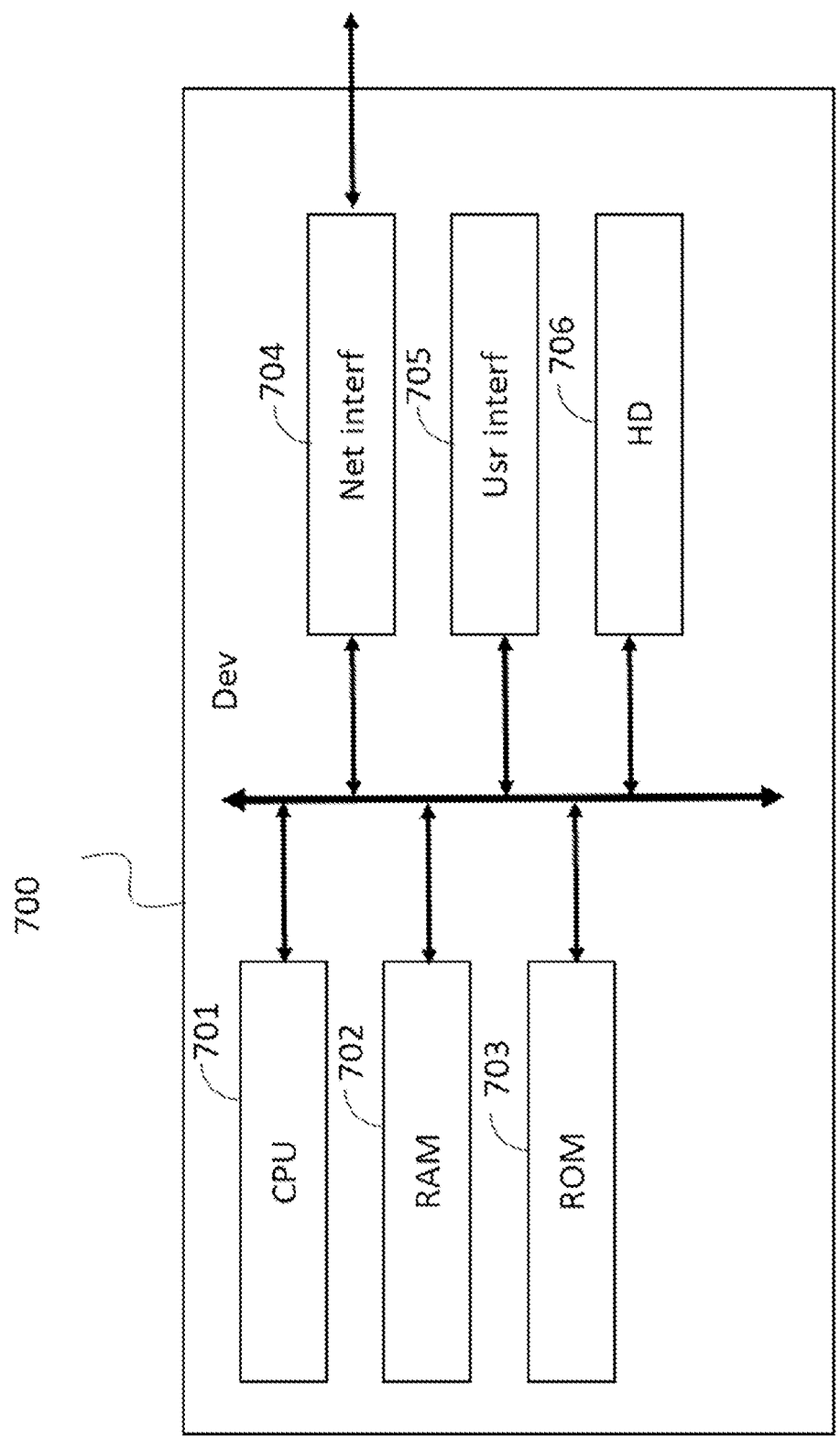

FIG. 7 schematically illustrates a device according to some embodiments.

DETAILED DESCRIPTION OF THE INVENTION

In what follows, embodiments are described that provide users of online services with means to define and communicate their choices regarding the processing of their personal data when using electronic communications, for example when visiting websites or using online services over networks.

These embodiments also allow online service providers or websites to adapt their communications to users' choices. They can thus communicate to them information that are more relevant and more respectful of their choices, such as for example commercial/promotional offers.

As described in what follows, a platform acts as a trusted intermediary between the users and the services they use to manage their choices regarding the processing of their personal data.

Figure 1:
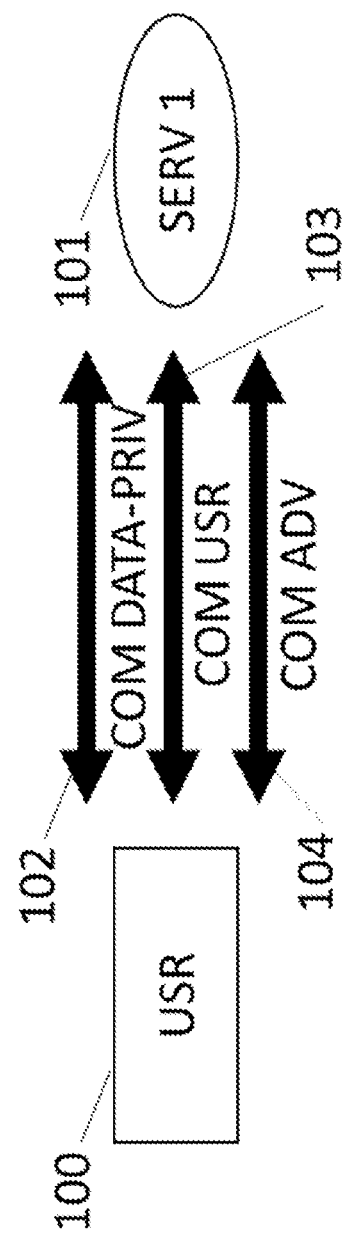
FIG. 1 illustrates a standard access to an online service on a network.

This platform greatly simplifies communications between a user and the service providers he uses. FIG. 1 illustrates a standard access to an online service over a network (e.g., the Internet). A user of a client system 100 (e.g., a personal computer, tablet, smartphone, or other) accesses via a network (not shown) an online service implemented by a remote system 101 (e.g., a server).

In a standard way, a large number of different communications are carried out. First, the online service initiates a number of communications (COM DATA-PRIV) aimed at determining the user's choices regarding personal data. For example, the server presents the policy implemented by the online service regarding cookies or tracking of site navigation etc. The server may make use of the service conditional on acceptance of certain conditions or ask the user to make choices from a list of possible browsing options. Then, the communication 102 (COM USR) between the remote system 101 and the client system 100 continues to provide the requested service based on the choices expressed in the first communication phase 102. During this second communication phase 103 or after this communication phase, a third communication phase 104 (COM ADV) can be set up aiming for example at making commercial offers (or other) to the user. This third communication phase also takes place according to the choices made by the user during the first communication phase 102. If the user did not take care of making the relevant choices during the first phase 102, he or she may then receive inadequate offers and this can disturb his or her use of the service on the remote system 101.

This mode of operation is both very tedious and complex for the user who must set up his use of each remote system for each access, at the risk, if he does not do so, of seeing his personal data used in an undesired way. This mode of operation is all the more tedious since a user has to go through the same process for each access to each different service he uses, as illustrated in FIG. 2.

Figure 2:
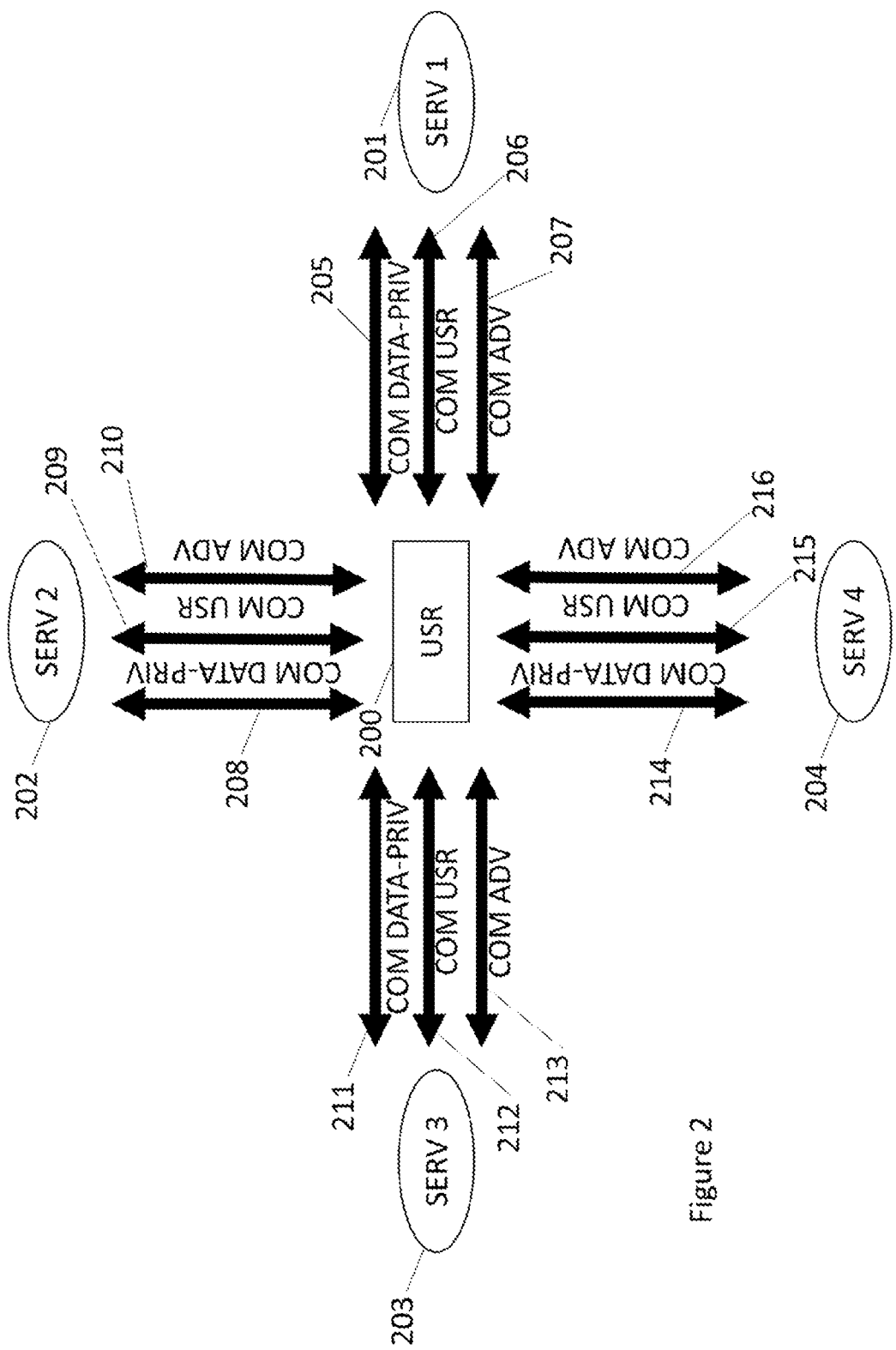
FIG. 2 illustrates a standard access to several online services on a network.

FIG. 2 illustrates a user using a client system 200, to communicate via a network (not shown) with remote systems 201, 202, 203, 204 (e.g. servers) providing respective services (SERV 1, SERV 2, SERV 3, SERV 4). The process described above is then to be followed for access by the system 200 to each remote system 201, 202, 203, 204. Thus, three communication phases 205 (COM DATA-PRIV), 206 (COM USR), 207 (COM ADV) are implemented between system 200 and system 201. Three communication phases 208 (COM DATA-PRIV), 209 (COM USR), 210 (COM ADV) are implemented between system 200 and system 202. Three communication phases 211 (COM DATA-PRIV), 212 (COM USR), 213 (COM ADV) are implemented between system 200 and system 203. Three communication phases 214 (COM DATA-PRIV), 215 (COM USR), 216 (COM ADV) are implemented between system 200 and system 204.

The settings to be made are then multiplied and it is easy to understand why choices in terms of personal data protection are often neglected. This is detrimental to users but also to service providers who cannot ensure a good level of user satisfaction when using their services.

According to embodiments as described below, the user is thus offered direct access to a centralized trusted platform (for example a web server), or indirectly (through an application), whose function is to allow him to define his choices regarding the use of his personal data online.

The platform offers an interface that allows a user to define the general purposes for which their online data is used. For example, he can specify whether or not he accepts targeted advertising based on his online behavior. For example, he can specify whether or not he wants to receive personalized promotions via email, text messages, or other forms of messaging. For example, he can specify whether or not he wants to be tracked online for statistical and/or research purposes. Other possibilities can be offered to him.

This platform can also have the function of offering the user the possibility, if necessary, to refine his choices according to the companies that might wish to use his or her personal data. For example, this may involve allowing certain specifically identified online sites to use the user's personal data for particular purposes, in derogation of an established general rule, or on the contrary, expressing additional restrictions for specifically identified online sites.

The trust platform can thus centralize all the choices defined by the user. The user can also consult, modify or delete his choices at any time on this centralized platform.

As described in what follows, access to this data can be protected by means of a user-specific authentication mechanism (such as a password).

Figure 3:
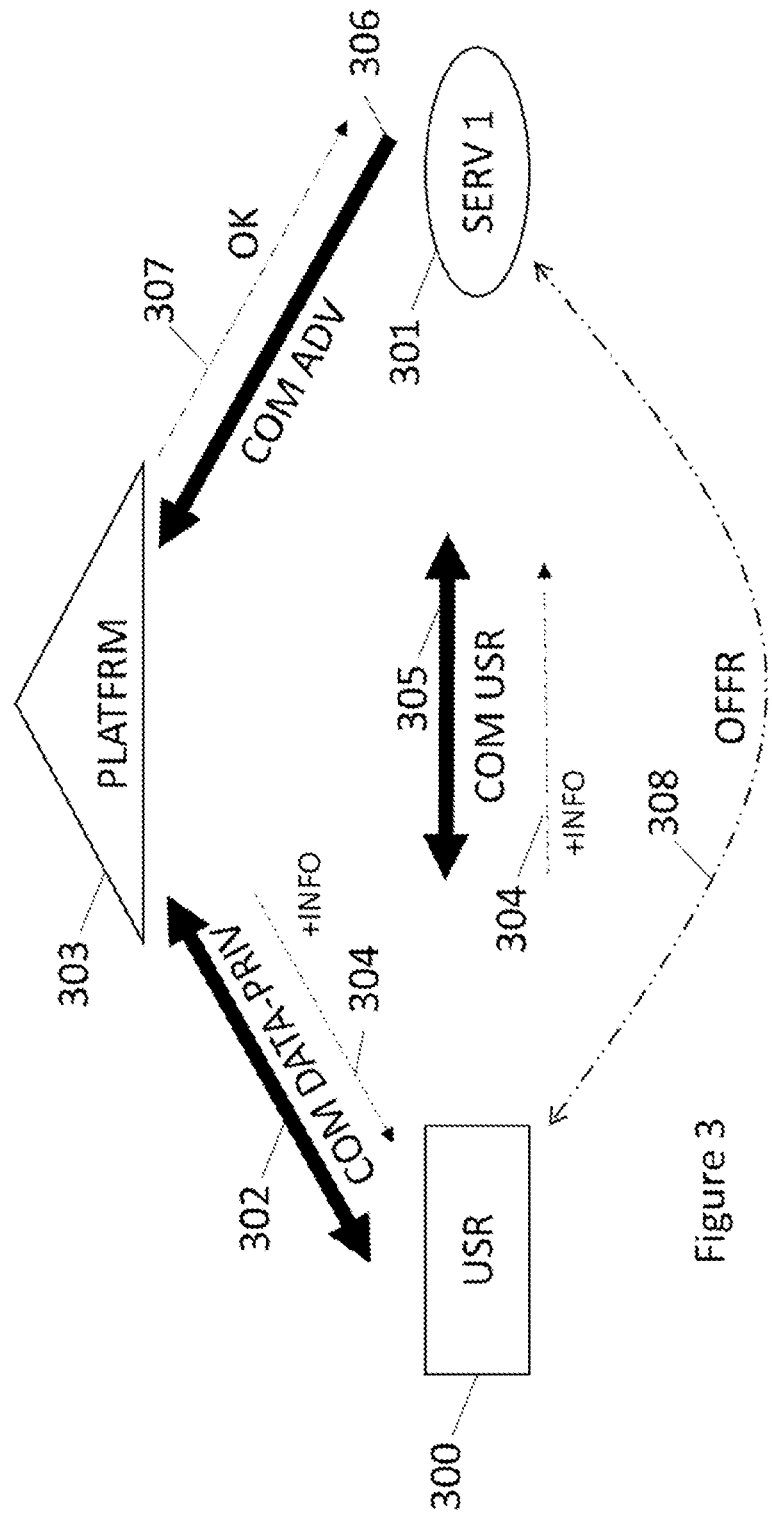
FIG. 3 illustrates a platform according to embodiments.

FIG. 3 illustrates a platform according to embodiments. A user accesses, via a client system 300 (USR), services provided by service provider, via a remote system 301, for example a server (SERV 1), via a network not shown.

Contrary to what happens conventionally and what has been presented with reference to FIG. 1, the user does not establish a communication aiming at defining his choices regarding the protection of his personal data with the remote system 301. Instead, he establishes such a communication 302, with another remote system 303, for example a server, which implements a platform according to the invention.

During this communication, the user defines his preferences regarding the protection of his personal data. In return, he receives a set of data 304 (+INFO) that will allow him to communicate his preferences to service providers as described in what follows. For example, this data may also include an identifier that identifies the user to the platform. For example, the data may include an encryption key to ensure the security of the user's identity and preferences as described below.

Using this information 304, the user can then initiate a communication 305 (COM USR) with the remote system 301. During this communication, the user's preferences are encoded so that the system can both establish the communication in accordance with the user's choices and also so that it can establish a communication 306 (COM ADV) with the remote system 303.

This communication 306 allows the service provider to make offers to the user, for example. The offer is therefore not made directly to the user. It passes through the platform, which will first ask the user or consult the relevant data 304 that the user has entered for this purpose and which are stored in the system 303. The platform will be able to recognize the user for whom the offer is intended because the system 301 has received an identification based on the data 304 as described below. If the platform authorizes the sending of the offer with a message 307 (OK), the remote system 301 then enters into direct communication 308 (OFFR) with the user via its client device 300.

According to embodiments for implementing a process as described above, the user installs, for example, a software extension of his online browsing module (the "browser") present on his client device 300 (computer, tablet, smartphone or other). For example, the user identifies himself to this extension by the same authentication mechanism he used to connect to the platform during the communication 302 (for example with a login and a password). The extension can then connect to the centralized platform to upload the user's choices for using their personal data online (the 304 data).

According to embodiments, the extension may also download a unique user identifier (referred to as a UIU hereafter) and a cryptographic encryption key (referred to as a CC hereafter). This data can be used to enhance the security of the user's personal data communications.

When communicating with service providers (web pages or otherwise), the client system 300, e.g., via the software extension, may alter the content requests sent to insert additional elements. For example, it is possible to add an encoding of the user's choices regarding the use of his personal data online. For example, and optionally, it is possible to add an encrypted identifier of the user that changes with each request, or with each group of requests. This encrypted identifier is for example formed by a cryptographic encryption of the UI and other information as described below.

For example, in the context of communications via HTTP or HTTPS protocol, the transmission of this additional data can be done by adding an "HTTP header" (or HTTPS) dedicated to this function, or by a particular cookie.

The service used (for example, a visited website) can then read the user's choices regarding the use of their personal data online through an automated process. The service can then adapt its behavior in order to respect these choices (as it has defined or updated them). For example, if the user does not want his or her browsing data to be used for targeted advertising, the service used can immediately block this form of personal data processing, without requiring an additional and time-consuming request for consent from the user.

For example, the service used may notify its acceptance of the user's choices by an acceptance flag that is provided in the response to the service request. The absence of an acceptance flag is, for example, taken as a refusal by the service provider to consider the user's choices.

For example, the browser software extension may detect the presence of this acceptance cookie in the request and inform the browser user of the presence or absence of this acceptance cookie in the request.

The embodiments thus allow the user to inform all online services that may be used of his or her personal data processing choices, as previously stored in the centralized trust platform.

In addition, the embodiments may allow the online services used to inform the user that they accept the choices expressed by the user.

Communication with the service provider can then be based on the response it provides to the user's choices.

According to embodiments of the invention, it is thus possible to offer information (such as for example an encrypted identifier) allowing online services to subsequently make commercial or promotional offers to targeted users via the centralized trust platform, as described below.

Figure 4:
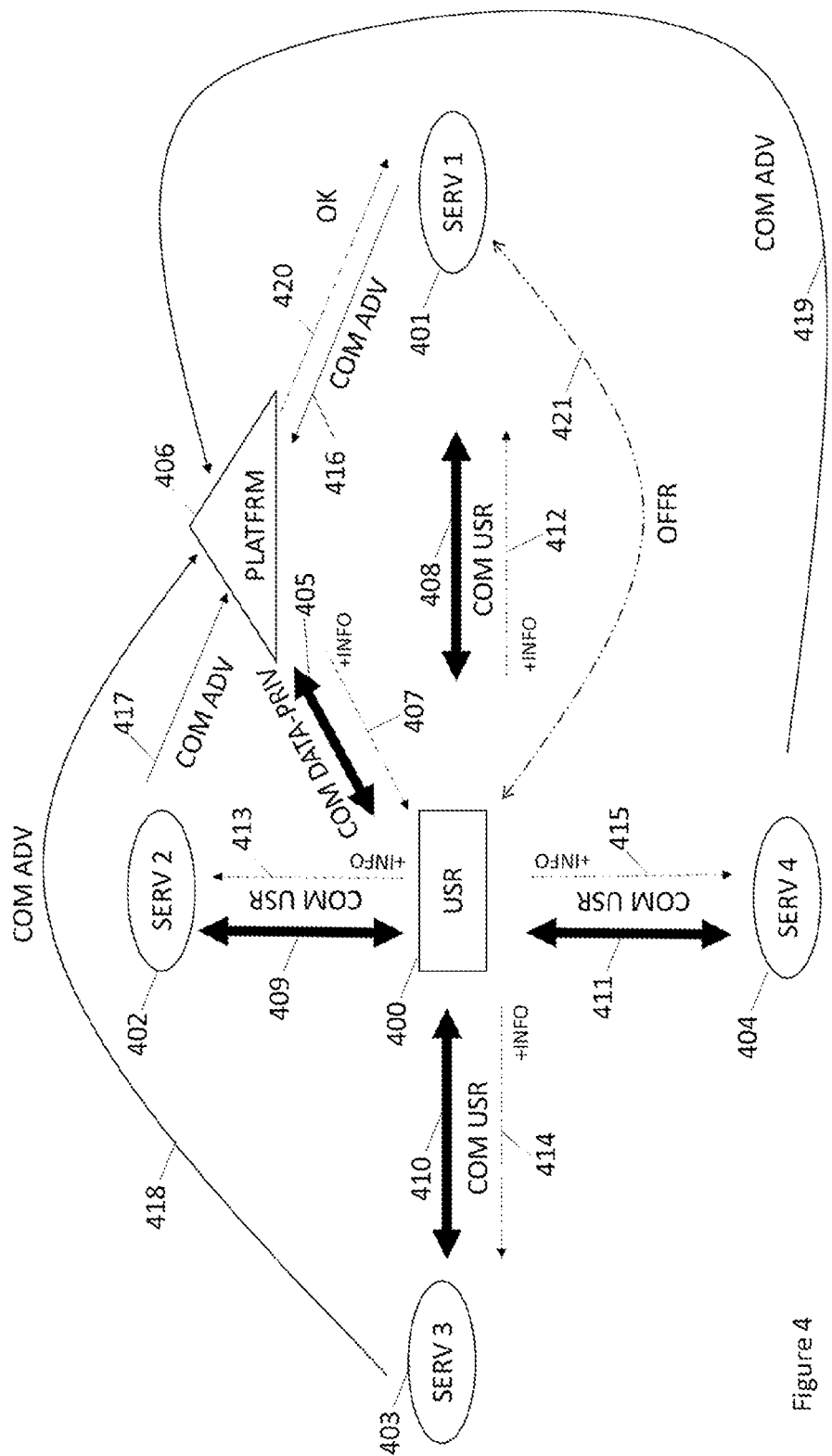
FIG. 4 illustrates advantages provided by embodiments of the invention.

FIG. 4 illustrates advantages provided by embodiments of the invention. It depicts a user using a client system 400 (USR), to communicate via a network (not shown) with remote systems 401, 402, 403, 404 (e.g. servers) providing respective services (SERV 1, SERV 2, SERV 3, SERV 4). According to the invention, the user configures his personal data preferences to the remote system 406 (PLATFROM) implementing a centralized platform for managing such data in a communication 405 (COM DATA-PRIV). In turn, it receives the information 407 (+INFO) necessary to communicate to the remote systems 401, 402, 403, 404, when it establishes respective communications 408, 409, 410, 411 (COM USR) with them. During these communications, the client system provides data 412, 413, 414, 415 (+INFO) comprising its preferences. Optionally, it may also provide the encrypted identifier allowing the remote systems to communicate personalized offers to the system 406.

Thus, instead of establishing four different communications to establish one's personal data preferences, only one communication 405 was established. In addition, the offers issued by the remote systems 401, 402, 403, 404 are not transmitted to the system 400; instead, these remote systems query the platform implemented by the system 406 in communications 416, 417, 418, 419 (COM ADV).

According to the illustrated embodiment, it is assumed that only the offer of the system 401 matches the user's preferences. In this case, the platform sends a message 420 (OK) authorizing it to contact the user directly in a communication 421 (OFFR).

Optionally, when the client system initiates communications with remote systems to access their services, it can form an encrypted identifier that will, while guaranteeing the anonymity of the user, allow the remote systems to target this user to the platform when transmitting their offers. For example, this encrypted identifier can be generated by an extension as described above.

The encrypted user ID can be formed in the manner illustrated in FIG. 5.

The user ID 500 (IUU) is concatenated with a cryptographically secure random number 501 (RNDM) that changes with each request to an online service (or each group of requests). It can also be concatenated with a predefined, invariant character set 502 (INVR). The random number is chosen from a set large enough so that it is in practice extremely unlikely that the same random number will be chosen twice by the software extension during its use (this is called a "nonce" in cryptography).

The set is encrypted in a step 504 with a cryptographic encryption algorithm, using an encryption key 505 (CC) known only by the user and the platform.

The use of this process to compute the user's 506 encrypted identifier (ID*) results in the following properties.

Unless the CC 505 key is known, it is in practice impossible for a provider to whom the encrypted ID* 506 has been provided to retrieve the value of the initial ID IUU 500 from the encrypted ID.

Moreover, unless the CC 505 key is known, it is in practice impossible for this service provider to link two distinct encrypted identifiers that have been provided to the same user, even though these two encrypted identifiers have been generated by the same software extension of the same user's browser.

Therefore, the encrypted ID* 506 cannot be used as a tool to track users online.

However, the encrypted ID* 506 can be transmitted by the service providers to the platform, which is able to find the user corresponding to the encrypted ID. Indeed, the centralized platform maintains a list of CC 505 keys distributed to users and stored by their browser extensions, for example according to the date of the request. Through a decryption 507 with one CC key 505 (or a small number of decryptions to try multiple candidate CC keys), the platform can therefore reverse the applied encryption process and retrieve the user's IUU 501 identifier, the random number, and the invariant predefined character set. In the case where several CC keys are candidates for decryption, the presence of the series of unchangeable predefined characters in the decrypted message confirms that the correct CC key was used.

The platform can then make a specific offer to the user (for example: commercial offer, coupon, etc.), acting as an intermediary between the visited site and the user. This intermediary role allows the platform to maintain the user's anonymity with respect to the service providers, especially if the user does not wish to take advantage of the offer.

To do this, the user logs back into the centralized trust platform and reads the offer that is addressed to him. If he accepts the offer, the centralized platform connects the online site to the user. If he refuses the offer, his anonymity is maintained vis-à-vis the online site.

This entire process is described in what follows with reference to FIG. 6, which schematically illustrates the communications between a remote system 600 (PLATFRM) for centralized management of user personal data, a client system 601 (USR) of a user, a personal data management client module 602 (BRWSR) of a user, and a remote system 603 (SERV) of a service provider.

Module 602 is accessible by the client system. For example, it is an extension of a browser as described. It can be integrated into the 601 system. It can also be a separate system. For example, if the user has configured his choices on one system and accesses the service provider with another one. The configuration in FIG. 6 is purely illustrative.

The process starts with a request 604 (Req_ID) from the client system 601 to the remote system 600 to record his personal data choices when exchanging with service providers. This can be the creation of an account where the user is asked for a login and password.

In response to this request, the remote system notably generates an ID identifier, unique to the user, in a step 605.

The system 600 stores this ID to recognize the user. The system may also generate the unique user identifier described above and the cryptographic key that may allow to secure the exchanges.

Next, the user defines his or her choices regarding the treatment of his or her personal data during a communication 606. For example, the user may fill out forms provided by the system 600 as he would do with a conventional service provider. This definition may be more refined and precise to adapt to different scenarios. The user's choices are then stored in a step 607. The user may, for example, update his or her choices on a regular basis by logging into the remote system 600.

The user's choices are stored in a format that can be communicated to online service providers to avoid the user being queried each time he or she connects to a remote system implementing such a service.

When the user wants to use online services, he may configure his communication tool. This may be a software extension for example. This is illustrated by module 602, to which he sends an initialization request 608 (Req_init). With this request, the user can communicate to the module 602 the information necessary to communicate with the remote system 600, for example his login and password. The module records this information in a step 609.

When the module is first used, or on a regular basis, the user may request the module to connect to the system 600 to update his preferences. Alternatively, the module 602 may automatically query the module 600, and may contact it on a regular basis. It may also do so at the invitation of the system 600, when, for example, an update to the user's preferences is available.

The module 602 then contacts the remote system 600 with a request 611 (Req_import) for the purpose of receiving data 612 comprising the user's choices in response. This data 612 may include the choices as stored in step 607. This information may also include the unique identifier IUU. It may also include the cryptographic key CC.

The module 602 then stores the preferences in a step 613. During this storage, specific formatting may be performed to allow them to be communicated to the remote system 603. Optionally, it can also proceed to a step 614 of generating an encrypted identifier ID* as already described, for example with reference to FIG. 5. For this, it uses, for example, the received unique identifier and cryptographic key.

The process continues when module 602 receives a connection request 615 (Req_serv) to system 603 from client system 601. For example, this is an http request to connect to a website. As already explained, the module 602 alters the request to include the user's personal data processing choices and his identifier (optionally his encrypted identifier). This altered request 616 (Req_serv(ID*, Pref)) is then sent to the system 603.

The server 603 analyzes the request and determines whether it accepts the user's choices in a step 617. It then notifies its response in a message 618, as discussed above. This response (for example an acceptance cookie) is then displayed to the user in a step 619, who can decide whether or not to continue his communication with the remote server in a step 620.

According to embodiments, the system 603 may decide to transmit to the system 600 a message 621 (OffR(ID*)) containing an offer to the user. This offer is accompanied by the user's identifier. Optionally, this is the encrypted identifier that does not allow the system 603 to identify or track the user but that will allow the system 600 to determine the identity of this user to whom the offer is intended.

Upon receipt of the message 621, the system 600 determines in step 622 the user for whom the offer is intended. This can be done by decrypting the encrypted identifier, if such an encrypted identifier is used as already described above.

If the offer matches the user's choices, a communication between the system 603 and the client system 601 is authorized by the system 600 to be transmitted to the user. This authorized communication may take the form of a message 623 (OffR) transmitted by the system 600 to the client system 601 directly as shown or via the module 602. Alternatively, it is the user who comes to consult it, either on his own by connecting to the platform or upon invitation from it. Alternatively, as illustrated in FIG. 4, if the offer corresponds to the user's choice, the authorized communication can be implemented by the system 603. In this case, the system 600 may send a message to the system 603 authorizing it to make its offer directly to the user. To do this, it may send the necessary data to the system 603. Alternatively, the system may make the offer as part of the communication (step 620) already in progress with the user.

FIG. 7 is a block diagram of a system 700 for implementing one or more embodiments of the invention. The systems or servers described above may have the same structure.

The system 700 includes a communication bus to which are connected:
- a processing unit 701, such as a microprocessor, referred to as CPU
- a RAM unit 702 for storing executable code of a method according to an embodiment of the invention as well as registers adapted to store variables and parameters necessary for the implementation of a method according to embodiments, the memory capacity of which can be extended by an optional RAM connected to an expansion port for example
- a memory unit 703, referred to as ROM, for storing computer programs for implementing the embodiments of the invention
- a network interface unit 704 connected to a communication network over which the digital data to be processed is transmitted or received. The network interface 704 may be a single network interface, or composed of a set of different network interfaces (e.g., wired and wireless interfaces, or different types of wired and wireless interfaces). Data is written to the network interface for transmission or read from the network interface for reception under the control of the software application running in the CPU 701
- a graphical user interface unit 705 for receiving input from a user or displaying information to a user;
- a 706 hard drive HD
- an I/O module 707 to receive/send data from/to external systems such as a video source or display.

The executable code may be stored either in read-only memory 703, on the hard drive 706, or on a removable digital medium such as a disk. According to one embodiment, the executable code of the programs may be received by means of a communication network, via the network interface 704, in order to be stored in one of the storage means of the communication system 700, such as the hard disk 706, prior to being executed.

The central processing unit 701 is adapted to control and direct the execution of instructions or portions of software code of the program(s) according to the embodiments of the invention, such instructions being stored in one of the aforementioned storage means. After power-up, the processing unit 701 is capable of executing instructions from the main RAM 702 relating to a software application after such instructions have been loaded from the ROM program 703 or the hard disk (HD) 706, for example. Such a software application, when executed by the CPU 701, causes the steps of a method to be executed according to embodiments.

The present invention has been described and illustrated in this detailed description with reference to the accompanying figures. However, the present invention is not limited to the embodiments shown. Other variants, embodiments and combinations of features may be deduced and implemented by the person skilled in the art from the present description and the attached figures.

To meet specific needs, a person skilled in the field of the invention may apply modifications or adaptations.

In the claims, the term "comprise" does not exclude other elements or steps. The indefinite article "a" does not exclude the plural. The various features presented and/or claimed may advantageously be combined. Their presence in the description or in different dependent claims does not exclude the possibility of combining them. The reference signs should not be understood as limiting the scope of the invention.

The invention claimed is:

1. A method of communicating over a network for access by a client system to a service on a remote system comprising the following steps:
    transmitting by the client system, a request to record personal data choices when exchanging with service providers, including said remote system;
    generating, by a user personal data management system, which is not part of the client system and which is not part of the remote system, an identifier of the user and storing said personal data choices in association with said identifier;
    requesting a definition of at least one choice of the user for processing personal data associated with the user, said at least one definition being associated with the identifier of the user;
    receiving data over the network, by a personal data management client module, from the user personal data management system, said data including said at least one definition of at least one choice of a user for processing personal data associated with the user, said at least one definition being associated with said identifier of the user;
    receiving, by said personal data management client module, from the client system a connection request to said remote system for the provision of said service;
    altering, by said personal data management client module, said connection request to include said at least one definition associated with said user identifier;
    transmitting said altered connection request to said remote system;
    analyzing, by said remote system, said altered request to determine the at least one choice of the user;
    establishing a first communication, between said client system and said remote system for the provision of said service based on said response of said remote system; and
    establishing by the remote system, a second communication between said remote system and said client system, according to said at least one definition.

2. The method according to claim 1, further comprising generating from said user identifier an encrypted identifier, and wherein, in said connection request to said remote system, said at least one definition is associated with said encrypted identifier.

3. The method according to claim 2,
wherein said remote system transmits to said user personal data management system a second communication proposal associated with said encrypted identifier, and
wherein said user personal data management system determines the user for whom said second communication is intended from said encrypted identifier.

4. The method according to claim 2,
wherein said user personal data management system generates said identifier as well as a cryptographic key for the generation of the encrypted identifier,
wherein said user personal data management system receives said at least one choice from the user for processing his personal data during a communication with the client system, and
wherein said user personal data management system stores said at least one definition.

5. The method according to claim 1, wherein, said at least one definition is stored within said personal data management client module accessible to the client system.

6. The method according to claim 5, wherein, said at least one definition is received from the user personal data management system and wherein said storing includes formatting said at least one preference for transmission to the remote system.

7. The method according to claim 6,
wherein said remote system analyzes said connection request to accept or not said at least one definition and transmit said response, and
wherein said personal data management client module displays said response to the user.

8. A communication device comprising a processing unit configured to implement steps according to a method according to claim 1.

9. A communication system comprising:
a client system;
a remote system; and
a system for managing personal data of a user of the client system using said client system to access a service on said remote system,
wherein the client system, the remote system, and the user personal data management system are configured to implement a method according to claim 1.

* * * * *